(No Model.) 4 Sheets—Sheet 1.
A. PUNTENEY & E. C. SOOY.
HAY LOADER.

No. 456,237. Patented July 21, 1891.

Witnesses:
F. G. Fischer
Thomas A. Lee

Inventors,
Archibald Punteney
Ephraim C. Sooy
By Rich'd H. Manning Atty.

(No Model.) 4 Sheets—Sheet 3.
A. PUNTENEY & E. C. SOOY.
HAY LOADER.

No. 456,237. Patented July 21, 1891.

Witnesses:
F. G. Fischer
Thomas A. Lee

Inventor:
Archibald Punteney
Ephraim C. Sooy
By Rich'd H. Manning Atty.

THE NORRIS PETERS CO., PHOTO-LITHO., WASHINGTON, D. C.

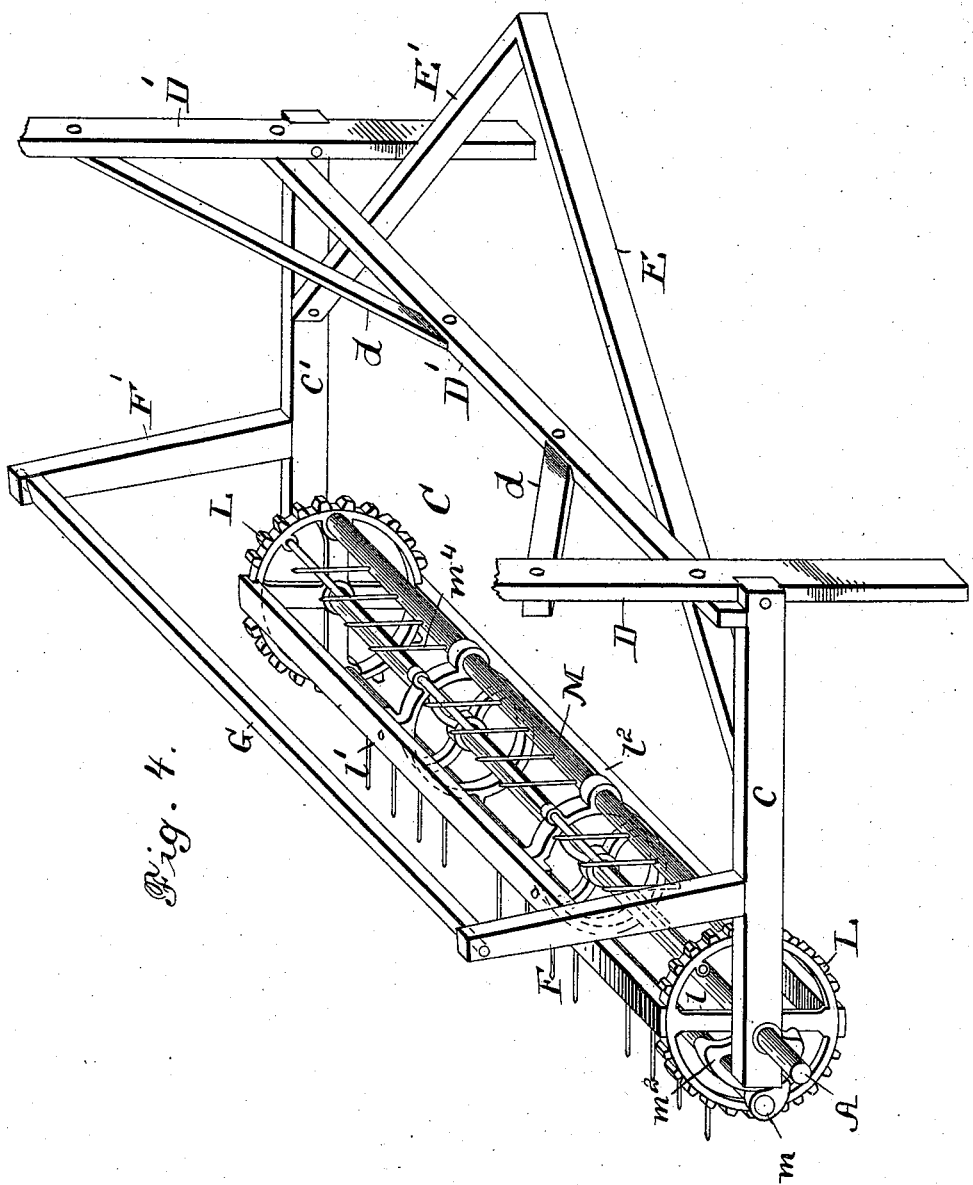

UNITED STATES PATENT OFFICE.

ARCHIBALD PUNTENEY AND EPHRAIM C. SOOY, OF KANSAS CITY, MISSOURI.

HAY-LOADER.

SPECIFICATION forming part of Letters Patent No. 456,237, dated July 21, 1891.

Application filed January 16, 1891. Serial No. 377,969. (No model.)

*To all whom it may concern:*

Be it known that we, ARCHIBALD PUNTENEY and EPHRAIM C. SOOY, citizens of the United States, and residents of Kansas City, in the county of Jackson and State of Missouri, have invented certain new and useful Improvements in a Combined Hay Rake and Loading Machines; and we do hereby declare that the following is a full, clear, and exact description of the same, reference being had to the accompanying drawings, forming a part of this specification.

Our invention has for its object, first, in a combined hay rake and loading machine, to take the hay from the rake and deliver it to the hay-loading machine; second, in a combined hay-rake and hay-loading machine having an intermediate rotary hay-fork which will automatically engage and disengage its fork-tines from the hay during its revolution; third, to prevent the clogging of the hay at the head of the rake; fourth, to concentrate the hay during its passage over the bed of the hay-loading machine; fifth, to retain the rotary axle-locking pawl in and out of engagement with the ratchet-wheel on the traction-wheel.

Our invention further consists in the novel construction and combination of parts, which will first be fully described, and then specifically pointed out in the claims.

Figure 1:
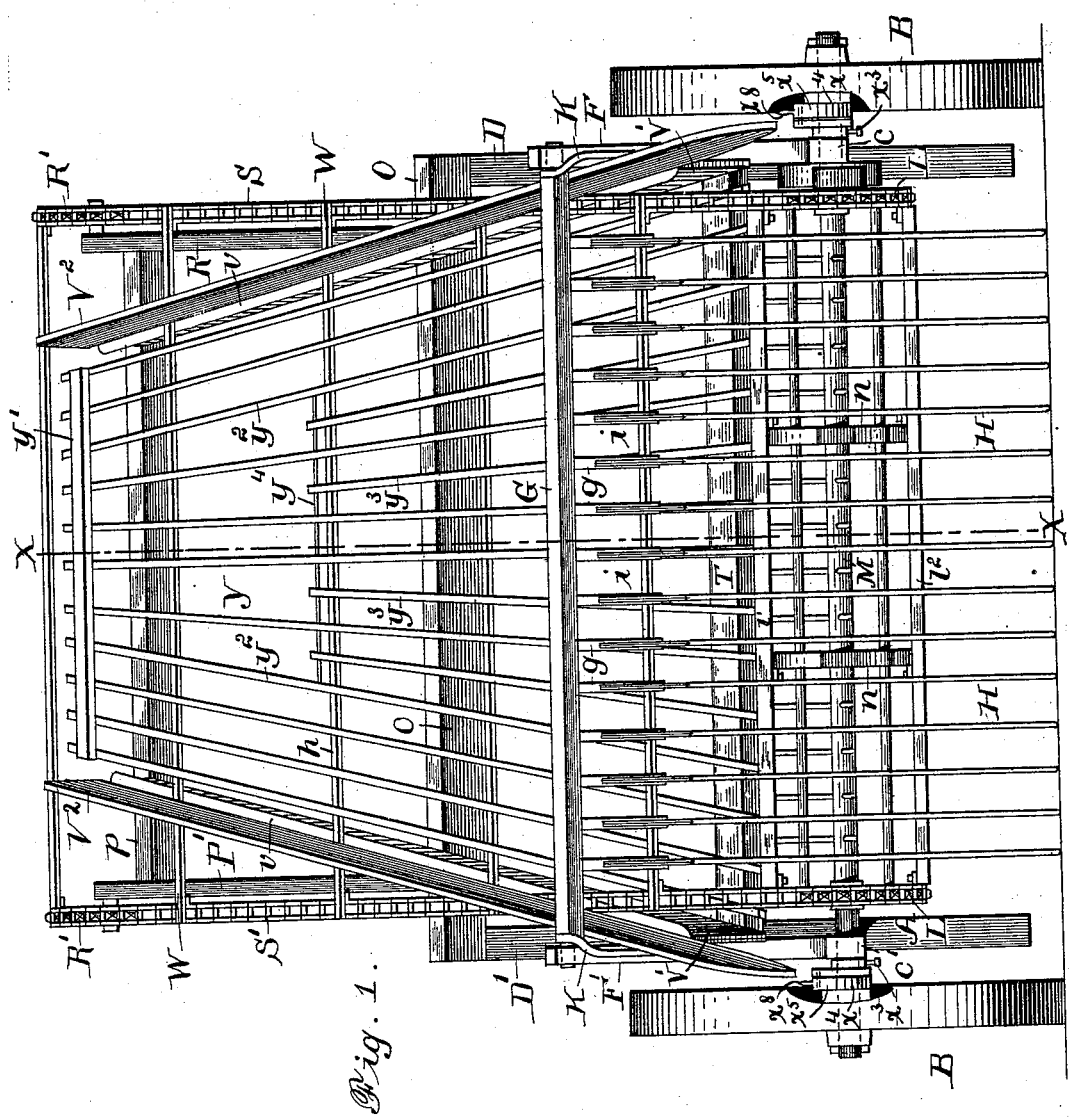
Figure 2:
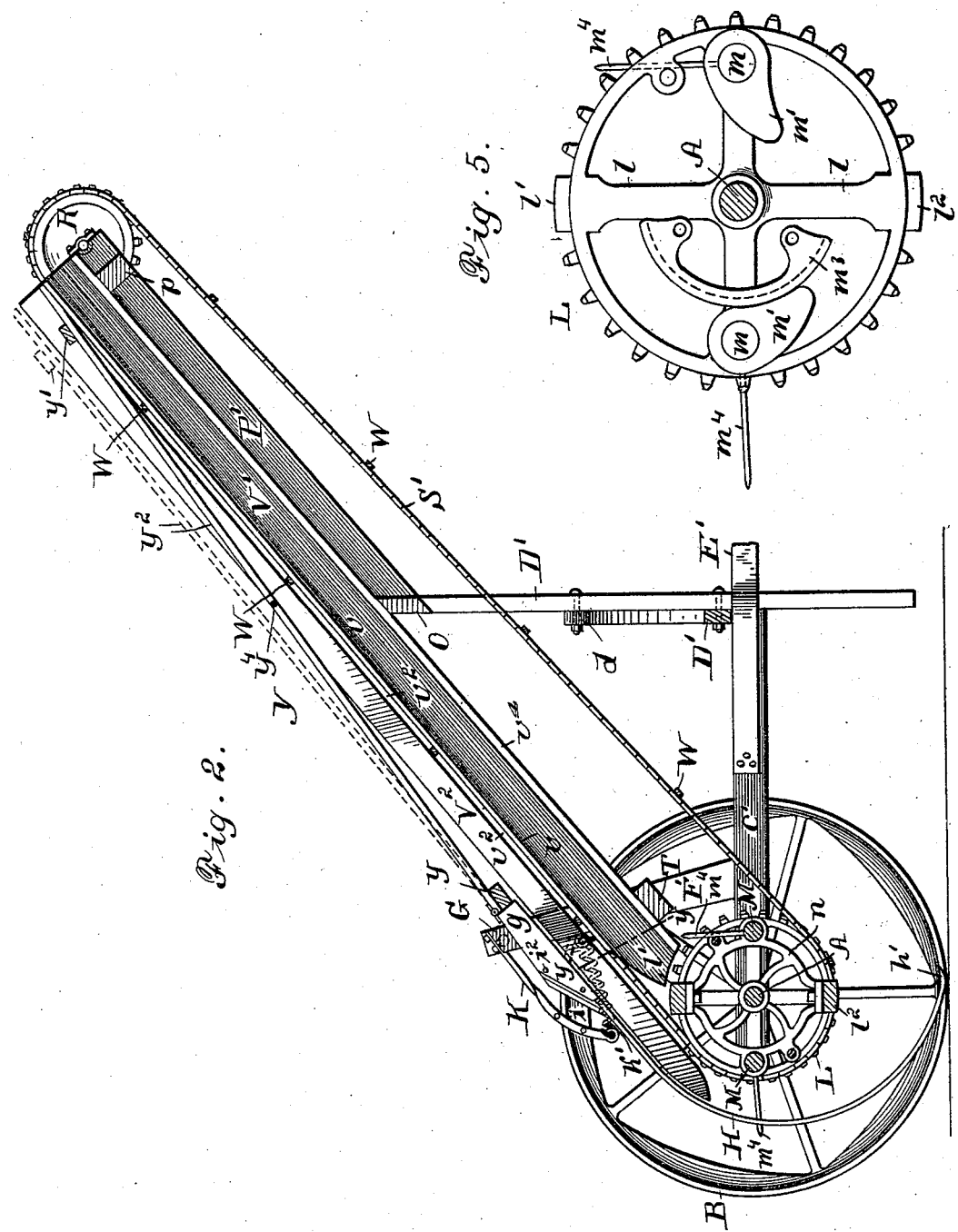
Figure 3:
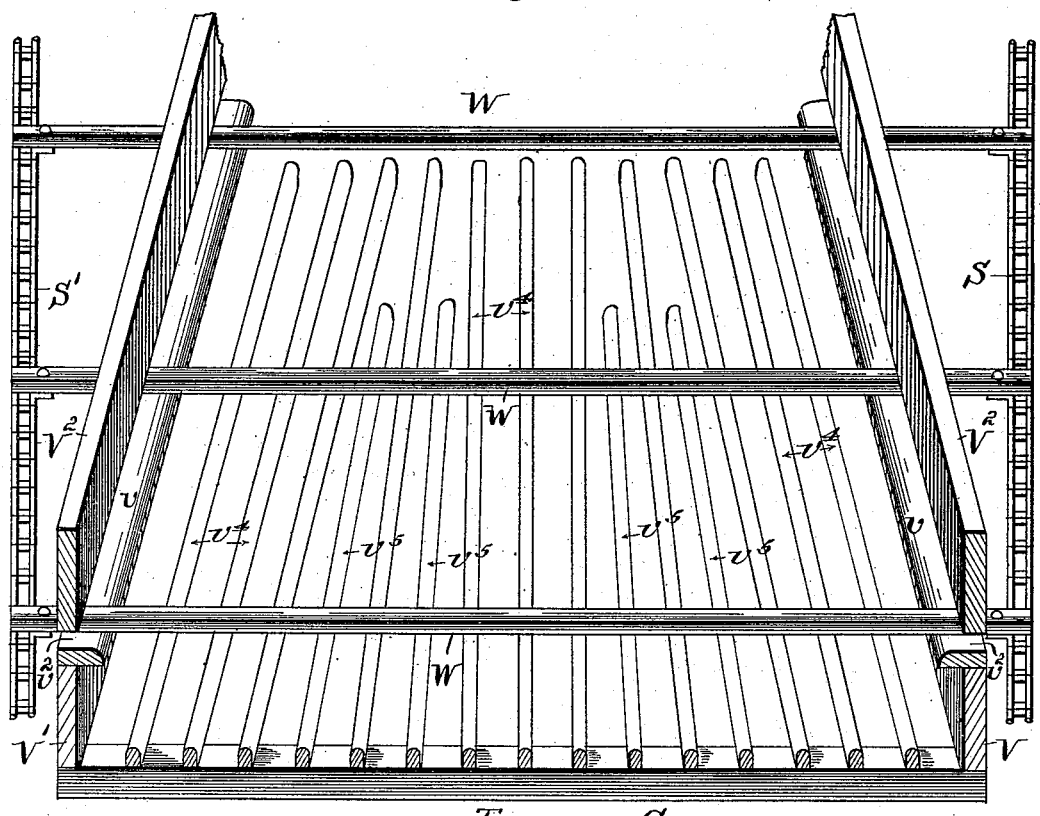
Figure 7:
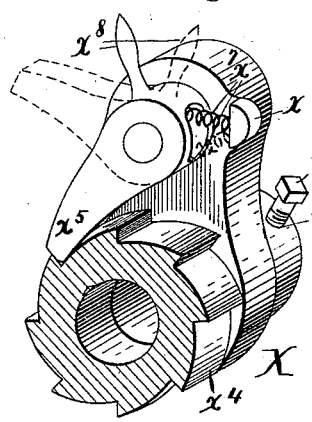
Figure 6:
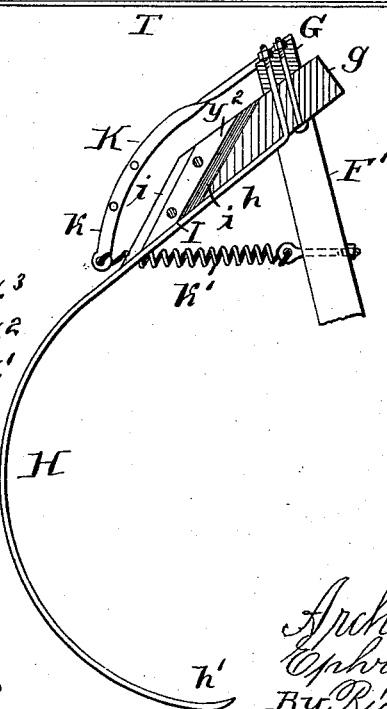

In the drawings, Figure 1 is a rear elevation of our combined hay rake and loading machine with portions of the rim of each traction-wheel broken away to show the pawl and ratchet-wheel. Fig. 2 is a vertical sectional view taken upon the line $x\ x$ of Fig. 1. Fig. 3 is a detail sectional view of the bed of the hay-elevating machine, taken upon the line $y\ y$ of Fig. 2. Fig. 4 is a detail view in perspective, showing the rotary fork-reel and the bed-supporting frame connected with the axle, also showing the draft-frame and the upper end portions of the bed-supporting standards broken away. Fig. 5 is a detail side view of one of the sprocket-wheels in the reel-frame, showing the fork-operating cam and dog. Fig. 6 is a detail broken view of one of the standards supporting the rake-head, and also with one of the fingers carrying the rake-tooth in section, the knife upon the rake-tooth and finger and the spring-retracted lever connected with the rake-head. Fig. 7 is a detail view in perspective of the pawl and ratchet-wheel upon the rotary axle.

Similar letters of reference indicate corresponding parts in all the figures.

In the construction of our invention, and referring to the drawings, A represents the single rotary axle supporting the machine. Loosely mounted upon the rotary axle A at each end are the traction-wheels B B. To the rotary axle A, near the hub of one of the traction-wheels B, is loosely mounted one end of a side bar $c$ of the bed-supporting frame C, and to the other end of said axle is loosely mounted a side bar $c'$, parallel with the bar $c$, both of which bars extend a sufficient distance from the rotary axle to carry the weight of the bed of the machine, as hereinafter described.

To the outwardly-extended ends of each of the bars $c\ c'$ is attached a vertical standard D. To one of the bars $c$ upon one side of the standard D is attached one end of a transverse connecting-bar D', the other end of which bar is connected with the bar $c'$. The standards D D are further supported by the braces $d\ d$, which extend from said standards to the bar D'. To the inner side portion of the bar $c$ between the standard D and the axle A is attached one end of a draft-bar E, the other end of which bar extends at an angle to the said bar $c$ and outwardly beneath the bar D'. To the other side bar $c'$ is attached one end of a similar draft-bar E', the other end of which bar extends to and is rigidly attached to the outwardly-extended end of the bar E. To the side bar $c$ a short distance from the axle A toward the standard D is attached the lower end of a short standard F, which is inclined rearwardly in a slight degree. To the other bar $c'$ is attached in a like position a similar standard F'. In the upper end portion of the standard F is journaled one end of the rake head or bar G, and the other end of said bar is journaled in the upper end of the standard F'.

To the under side portion of the bar G the proper distance from the standard F is attached rigidly one end of a finger $g$, which extends rearwardly and is inclined downwardly toward the rotary axle A, being one of a series of similar fingers attached to said bar G and arranged between the ends of said bar an equal distance apart. To the under side portion of each finger $g$ is attached rigidly the upper end portion $h$ of a rake-tooth H, which tooth extends downwardly in an outwardly-curved line, and the other end portion $h'$ of said tooth is bent forward and upwardly in a slight degree at an angle to the surface of the ground and the curved line of the tooth.

Each finger $g$ is separated longitudinally into two separate parts and the rear end portion of said finger inclined from its upper surface in a downward direction to the rake-tooth H. Between the separate parts of the finger $g$ is placed flatwise a thin reversible blade of steel I. One end portion of the blade I is made to describe an angle corresponding to that of the inclined surface of the finger $g$, and is also made with a cutting-edge $i$. The other end of the blade I is also made with a cutting-edge $i'$, which is inclined in the same direction and at a like angle as the edge $i$. The cutting-edge $i$ of the blade I is projected a short distance beyond the inclined surface of the finger $g$. Through the separate parts of the finger and the blade I are inserted the blade-securing pins $i^2$.

To each end portion of the rake-head G, near each respective standard F F', is attached one end of a lever K, the other end $k$ of which lever extends a short distance in a rearwardly-curved direction and is perforated at $k'$ to receive the end strand of a spiral spring, the other end of which spring is attached to the standard F.

Upon the shaft A, upon the inner side of the bar $c$, is rigidly mounted a sprocket-wheel L, and upon the other end of said shaft and within the bar $c'$ a similar sprocket-wheel. From the rim of the sprocket-wheel L to the axle A are radial arms $l\ l$. To the rim of one of the wheels L, in line with the arm $l$, is attached one end of a transverse connecting-bar $l'$, the other end of which bar is attached rigidly to the rim of the other sprocket-wheel L at the other end of axle A. To the rims of the said wheels L L, and upon the other side of the axle A, in line with the arms $l\ l$, is attached in a similar manner the connecting-bar $l^2$. At right angles to the arms $l\ l$ in each of the wheels L L are the radial arms $l^\times\ l^\times$, each one of which arms in each wheel near the rim of said wheel is perforated in a transverse direction. Through one of said perforations in one wheel L is inserted the journal $m$ of a rock-shaft M, the journal upon the other end of which shaft is inserted through the perforated arm of the other wheel L at the other end of the axle A. Upon the other side of axle A, and through the perforated arms $l^\times\ l^\times$, in line with the other arms $l\ l$, and also extending to and journaled in the other wheel L, is a similar shaft M. Upon the end of each journal which extends beyond the outer side of each of the sprocket-wheels L L is rigidly attached a dog $m'$. Upon the end of the side bar $c$, which extends in rear of the axle A, and upon the inner side portion of said bar in the path of the dog $m'$, is attached a cam $m^2$. Upon the inner side of the other side bar $c'$ is attached in a similar manner a cam $m^3$.

Upon the shaft M, upon one side of axle A, is attached rigidly one end of a fork-tooth $m^4$, which extends a short distance radially from said shaft, being one of a series of similar teeth arranged in a single line a suitable distance apart.

To one of the sprocket-wheels L, upon the under side of the rim, is attached one end of a check-rod N, which rod extends in rear of the teeth $m^4$, and the other end attached to the other sprocket-wheel L on shaft M. Upon the other side of axle A and in a corresponding position and attached in a similar manner to the sprocket-wheels L L is a check-rod N'.

Between the sprocket-wheels L L on shaft M are supporting-disks $n\ n$, which aid in carrying the shafts M M, rods N N, and the bars $l'\ l'$.

To support the bed of the hay-loading machine, a transverse beam O is attached at one end to the upper end of one of the standards D on the side bar $c$ of the frame C, and the other end of said beam attached to the upper end of the standard D' on the side of the box $c'$, said standards D D' being made of a sufficient height to give the desired angle to the bed of the loading-machine. To the outer side of beam O, near the standard D, is rigidly attached one end of a sprocket-wheel-supporting beam P, which extends outwardly and upwardly at an angle or pitch to the said standard, and upon the outer side and end of said beam is pivotally attached a sprocket-wheel R. Upon the other end of beam O, near the standard D', is attached a similar beam P', which is parallel with the beam P, and upon its outer side and end is attached a sprocket-wheel R', which is similar to the sprocket-wheel R. Over the sprocket-wheel R, on the beam P, is passed one end of a sprocket-chain S, the other end of which chain is passed over the sprocket-wheel L in line therewith on the rotary axle A, and both ends of the chain connected together in the usual manner. Over the other sprocket-wheel R' on the beam P' is passed one end of a sprocket-chain S', the other end of which chain is passed over the sprocket-wheel L in line therewith on the axle A, and both ends connected together in the usual manner. To the bar P, near the outer end portion, is attached one end of a transverse bed-supporting bar $p$, the other end of which bar is rigidly attached to the bar P.

To the inner side of the standard F, a short distance above the side bar $c$, is attached one end of a transverse supporting-bar T, the other end of which bar is attached to the standard F' upon the side bar $c'$. To the said inner side of the standard F is also attached flatwise a guide-plate V, which extends the entire length of the loading-machine, and is inclined from said standard F inwardly at an angle to the supporting-bar T. The lower edge portion of the plate V at one end rests upon the upper side portion of the bar T, and on the transverse bar $p$ at the other end. The upper edge portion of the plate V extends in a vertical direction to a height nearly in the plane of the upper portion of the sprocket-chain S, and upon said upper edge of the plate V is an inwardly-extended flange or plate $v$. To the inner side of the other standard F' is attached one end of a guide-plate V', which is similar in width and length to the guide-plate V, and is also made with a flange or plate V upon its upper edge. The guide-plate V' is inclined inwardly at an angle to the transverse bar T and in the same degree as the plate V. Vertically in line with each one of the plates V V' is a longitudinal extension-plate $V^2$. This plate $V^2$ is also attached flatwise at one end to the inner side of the respective standards F F', and is slightly narrower in width than the plates V V'. One end portion of the plate $V^2$ extends rearwardly a short distance over the axle A and is contracted in width or pointed, and the other end terminates near the end of the plates V V'. Between the lower edge portion of each plate $V^2$ and the flange $v$ upon the lower edge of the respective plates V V' is formed a longitudinal opening $v^2$.

To the outer side portion and one of the sprocket-chains S is attached one end of a transverse hay-moving bar W, which passes through the longitudinal opening $v^2$ between the plates $V^2$ and V upon one side of the machine, thence to and through the opening $v$ between the plates $V^2$ V' upon the other side of the machine, and thence attached rigidly to the outer side portion of the sprocket-chain S'. Similar transverse bars W are attached to the separate sprocket-chains in a corresponding manner and arranged a short distance apart in succession upon the endless chain.

The bed of the loading-machine consists of a series of separate longitudinal bars $v^4$ $v^4$, each narrow in width, a number of which bars $v^4$ $v^4$ upon one side of the bed of the machine are placed parallel with the side plates V and attached to the upper side of the bar T at one end and the bar $p$ at the other. Upon the other side of the bed are similar bars $v^4$, which are parallel with the plate V'. Between the sides V V' and the bars $v^4$ $v^4$, parallel with the respective sides V V', are arranged a number of bars $v^5$ $v^5$, which are shorter in length than the bars $v^4$ $v^4$, and are arranged in converging lines toward the upper end of the bed of the loading-machine. The lower ends of the bars $v^5$ are attached to the bar T. The upper ends are connected with the transverse beam O.

Between the sides V V' and upon the bars $v^4$ $v^4$ of the bed of the loading-machine is a vibrating frame Y. Said frame Y consists of a transverse bar $y$, which is hinged at $y'$ to the rear end portion of the fingers $g$ of the hay-rake, and a short bar $y$, which is directly over the bar $p$ at the upper end of the bed of the loading-machine. To the bar $y$ is rigidly connected one end of the separate bars $y^2$ $y^2$, which are also arranged in converging lines corresponding to the bars $v^4$ $v^4$ of the bed of the loading-machine, and the outer ends of said bars $y$ $y$ are attached to transverse bar $y'$. The intermediate bars $y^3$, which are short in length, in the frame $y$ are secured at their outer ends to a transverse strip $y^4$, attached to the under side portion of the bars $y^2$ $y^2$.

Upon the rotating axle A, near the outer side portion of the side bar $c$, is mounted a short radial arm $x$. Upon the axle A and attached rigidly to the side of the arm $x$ opposite the bar $c$ is a sleeve $x'$, which is provided with a screw-threaded perforation $x^2$, in which perforation is fitted a set-screw $x^3$.

Upon the inner side portion of the hub $b$ of the traction-wheel B is rigidly secured a ratchet-wheel $x^4$. To the outer end portion of the arm X and upon the side having the ratchet-wheel $x$ is pivotally attached a pawl $x^5$. In rear of the pawl $x^5$, upon the side of the arm X, is cast a lug $x^6$. To the lug $x^6$ is attached one end of a spiral spring $x^7$, the other end of which spring is attached to the pawl $x^5$ at a point directly in line with and at the rear end of the said pawl. To said rear end portion of the pawl $x^5$, above the point of attachment of the spring, is attached a short handle $x^8$.

In the operation of our improved hay-loading machine the draft-bars E E' are placed upon and pivotally secured to the rear end portion of the hay-rack of a wagon, which elevates the upper end of the bed of the hay-loading machine above the wagon. The pawl $x^5$ upon the arm X on the rotating axle A is placed in engagement with the teeth of the ratchet-wheel $x^4$ upon the hub of the traction-wheels B B and power applied to draw the wagon and hay-loading machine. The hay upon the ground in advance of the teeth H of the hay-rake is gathered and accumulated, and the accumulation forces an amount of hay in an upward direction and in the path of the tines $m^4$ of the rotating hay-fork. In the rotation of the axle A motion is imparted to the sprocket-wheels L L and the sprocket-chains S S'. The dogs $m'$ upon the tine-carrying shaft M come into contact with the lower portion of the cams $m^2$ $m^3$ upon the respective side bars $c$ $c'$, and the tines $m^4$ on said shafts M are brought rigidly into position in the direction of the teeth H of the hay-rake, and the hay is carried in an upward direction upon the tines of the hay-fork and deposited upon the lower end portions of the slats $v^4$ $v^5$ of the bed of the hay-loading machine. As soon as the hay is deposited the dog $m'$ passes from the upper end of the cams $m^2$ $m^3$, the action of the cam upon the shaft M and the tines of fork ceases, and the tines yielding to the slight resistance of and automatically disenengaging from the hay, are forced back upon the rod N and pass the lower end portion of the bed of the loading-machine without contact therewith. The hay deposited upon the bars at the lower end of the bed of the hayloading machine between the guide-plates V V' V$^2$ is then forced by the transverse bars W upon the sprocket-chains S S' in an upward direction and beneath the flange $v$ of the sides $v$ $v'$, and the hay lying directly upon the bars $v^4$ $v^5$ is depressed slightly between the said bars, and in the action of the bars W in forcing the hay upward beneath the frame Y the hay, in following the converging openings between the bars, is brought closer together and made compact, and is then delivered from the upper end of the bed of the hay-wagon.

Under high winds the frame Y serves to prevent sudden dispersion of the loose hay and assists in keeping the hay well within the openings between the bars $v^4$ $v^4$.

In the elevation of the hay in a combined hay rake and loading machine a small portion of the hay is carried upwardly upon the rear portion of the teeth of the rake and lodged against the rake-head, and this occurs when one tooth occasionally steps over a portion of the hay taken up by the adjoining teeth. The amount thus passing over the rake-teeth in our improved machine meets the cutting-blade $i$ and is cut loose, falls upon the rotating hay-fork, and passes along with the other hay.

Whenever the cutting-edge upon one end of the blade I becomes dull, the securing-screws $i^2$ are removed and the plate reversed and the other cutting-edge placed in position.

In our rake-tooth the lower end $h'$ avoids taking up the dead grass and other trash and at the same time takes up the cut hay or grain which lies in its path upon the top of the stubble. In meeting obstructions which spring the teeth of the hay-rake the teeth are permitted to yield by means of the spring $k'$, which retains the elevating-lever K on the rake-head G under sufficient tension at all times.

In going to and from the field, or when the rotation of the sprocket-wheels is not desired, the handle $x^3$ on the pawl $x^5$ is operated to throw the pawl from engagement with the ratchet-wheel $x^4$ on the hub of the traction-wheel B, when the rotary movement of the axle ceases.

Our improved loading-machine may be operated in other ways than as herein described—as, for instance, the machine may be made stationary and elevated so far as to permit the traction-wheels to be operated with a power-driven belt. In this manner the hay is supplied to the hay-fork as fast as necessary, and any suitable hay-retaining receiver used in place of the hay-rake.

Having fully described our invention, what we now claim as new, and desire to secure by Letters Patent, is—

1. In a hay-loading machine having suitable sides and a rotating axle, the combination, with said axle, of a rotary fork-carrying frame having sprocket-wheels, a bed-supporting frame upon the side of said machine, and upwardly-inclined bars connected with said frame, having sprocket-wheels, separate endless sprocket-chains extending over the sprocket-wheels on said fork-carrying frame and said bars, and transverse hay-moving bars connected with said sprocket-chains, means for rotating the axle to said machine, and a bed upon said bed-supporting frame beneath said transverse bars on said sprocket-chains, having outwardly-inclined converging bars and openings between said bars, and longitudinal slotted sides to said bed, substantially as and for the purpose described.

2. In a hay-loading machine having a suitable bed and longitudinal slotted sides to said bed and parallel sprocket wheels and chains, and movable hay-carrying bars in the slot in said sides connected with said sprocket-chains, the combination of flanges upon the inner side portion of said sides beneath said movable bars, substantially as described.

3. In a combined hay rake and loading machine, a rake composed of rake-head and hay-gathering teeth, the combination, with said rake-teeth, of grass-cutting knives upon the rearwardly and downwardly inclined portions of said teeth, each having a downwardly-inclined cutting-edge, substantially as and for the purpose described.

4. In a combined hay rake and loading machine, a rake having a rake-head and tooth-carrying fingers connected with said rake-head, the combination, with said fingers, of a blade having reversible cutting-edges, substantially as described.

5. In a combined hay rake and loading machine, a rake having a rake-head and tooth-carrying fingers connected with said head in separable parts, the combination of a reversible grass-cutter detachably secured to and between the separate parts of the fingers of said rake-head, substantially as described.

6. In a combined hay rake and loading machine having traction-wheels, the combination of a rotating axle and an arm connected with said axle, a ratchet-wheel upon the said traction-wheels, and a pawl upon said arm engaging with the teeth of the said ratchet-wheel, as and for the purpose described.

ARCHIBALD PUNTENEY.
EPHRAIM C. SOOY.

Witnesses:
S. L. C. HASSON,
H. R. TOMLINSON.